Figure 4:
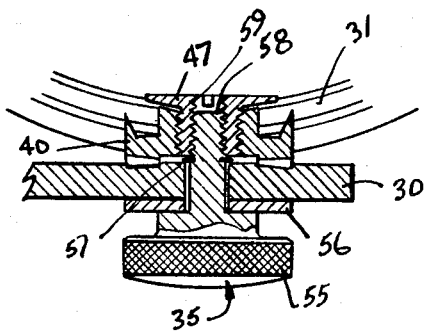

Aug. 9, 1966  D. J. FRIEDMAN  3,265,063
CORRECTIVE SHOE
Filed Aug. 8, 1962  6 Sheets-Sheet 1
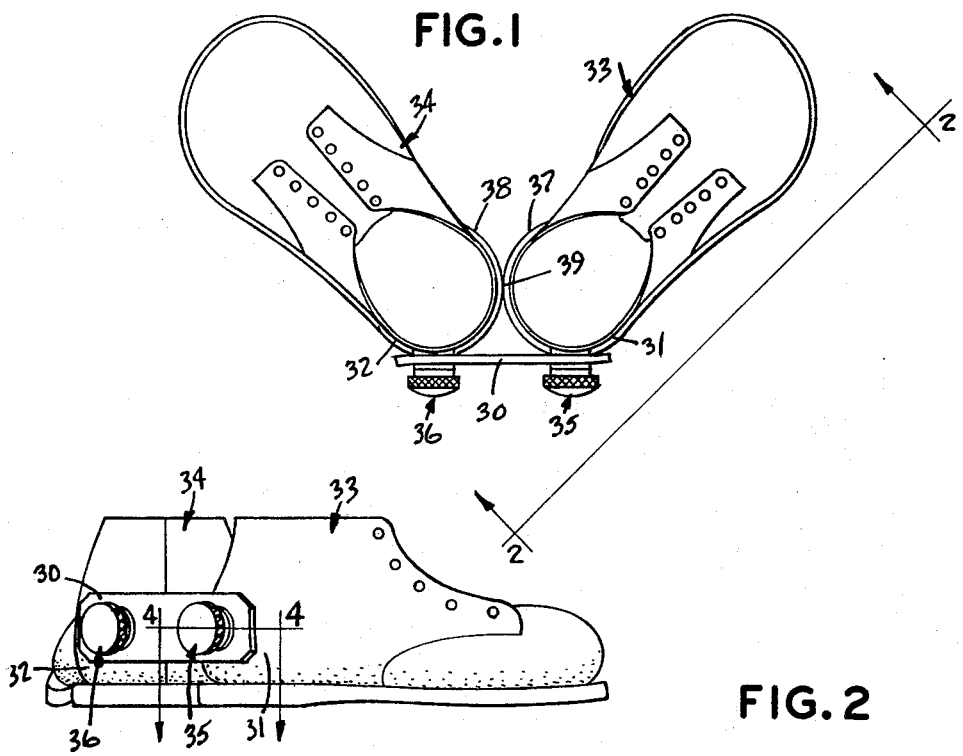
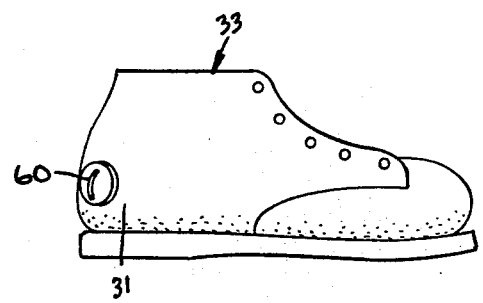
INVENTOR.
DONALD J. FRIEDMAN
BY
*Hyde W. Ballard*

Aug. 9, 1966

D. J. FRIEDMAN 3,265,063

CORRECTIVE SHOE

Filed Aug. 8, 1962

6 Sheets-Sheet 2

INVENTOR.
DONALD J. FRIEDMAN

BY
H. W. Ballard

Aug. 9, 1966 D. J. FRIEDMAN 3,265,063
CORRECTIVE SHOE

Filed Aug. 8, 1962 6 Sheets-Sheet 3

INVENTOR.
DONALD J. FRIEDMAN
BY
*Hyde W. Ballard*

Aug. 9, 1966  D. J. FRIEDMAN  3,265,063
CORRECTIVE SHOE

Filed Aug. 8, 1962  6 Sheets-Sheet 4

INVENTOR.
DONALD J. FRIEDMAN
BY
Hyde W. Ballard

Aug. 9, 1966

D. J. FRIEDMAN 3,265,063

CORRECTIVE SHOE

Filed Aug. 8, 1962

6 Sheets-Sheet 5

INVENTOR.
DONALD J. FRIEDMAN

BY
Hyde W. Ballard

Aug. 9, 1966 D. J. FRIEDMAN 3,265,063
CORRECTIVE SHOE
Filed Aug. 8, 1962 6 Sheets-Sheet 6
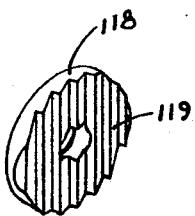
FIG. 26
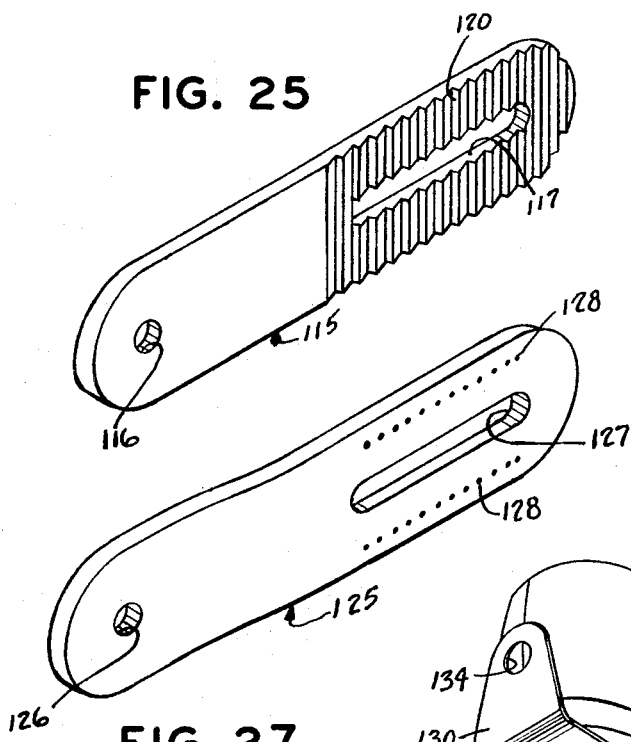
FIG. 25
FIG. 27
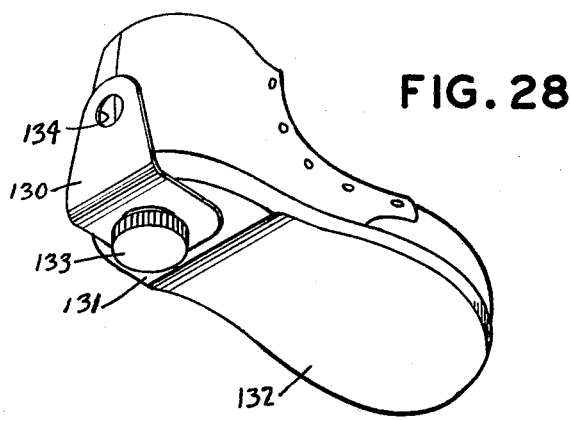
FIG. 28
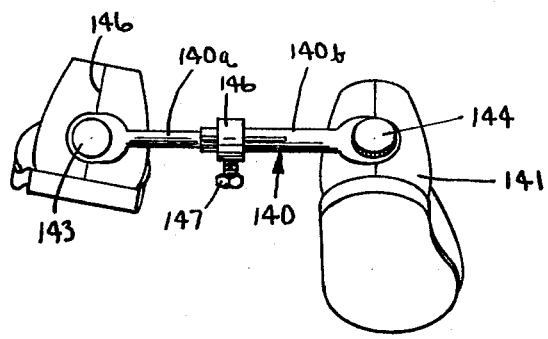
FIG. 29
INVENTOR.
DONALD J. FRIEDMAN
BY
Hyacw. Ballard

United States Patent Office 3,265,063
Patented August 9, 1966

3,265,063
CORRECTIVE SHOE
Donald J. Friedman, 20 N. High St., West Chester, Pa.
Filed Aug. 8, 1962, Ser. No. 215,630
16 Claims. (Cl. 128—80)

This invention relates to an orthopedic device and more particularly an improved splint for maintaining footwear in a predetermined fixed position or in a position to permit limited movement of the feet or lower limbs in certain desired directions.

In the correction of leg and/or foot deformation, particularly in young children, the present practice is to use an external splint which is rigidly attached to the child's shoes in such a way that the shoes are usually no longer usable, and furthermore the shoe cannot be removed from the splint assembly. Many such devices permit only limited adjustment or are capable of correcting only one specific condition rather than to cure simultaneously a compound malformation which is frequently the case. These prior devices are extremely heavy, cumbersome, and in no case can the child walk or manipulate his feet when wearing them. They are very damaging to bedclothes and furniture and to such an extent that it is not uncommon to replace the crib sheets every night.

The present invention overcomes the above disadvantages of the prior art devices by providing an adjustable splint for footwear which in one form maintains the wearer's feet at a fixed minimum angle with respect to each other while permitting limited movement in other directions. The invention also includes the provision of flexible and rigid splints, each of which may be quickly detached from the shoes permitting normal wear in the daytime or at any other time when it is not considered necessary for the splint to be used. The shoes may be provided with a protective cap which is readily installed over the connector on each shoe so that damage to clothes, furniture, etc. is eliminated.

In order to provide a complete range of adjustability and flexibility in my improved splint, one form insures a predetermined fixed angular position and spacing between the feet and at the same time permits limited movement or flexing of the ankles in planes generally parallel to the legs. An important object of the invention also resides in the provision of a simple fixture whereby the location of the splint attaching element can be readily determined in accordance with the surgeon's prescription.

A further object of the invention is to provide a flexible splint for corrective shoes which retains either shoe at a minimum predetermined angle and permits limited movement of the shoes with respect to each other.

A further object of the invention is to provide a rigid splint for corrective shoes which is capable of being quickly attached to and detached from the shoes at predetermined adjustable positions.

A further object of the invention is to provide a rigid splint for corrective shoes having a fixed length but permitting rotation of the shoes with respect to each other.

A still further object is to provide a fixture for marking corrective shoes for convenient attachment of the splint of the present invention.

Further objects will be apparent from the specification and drawings in which

Figure 5:
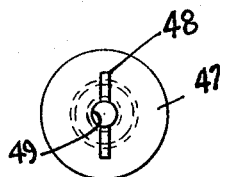
Figure 6:
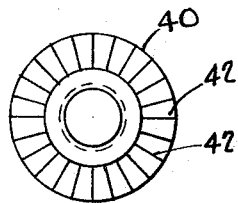
Figure 8:
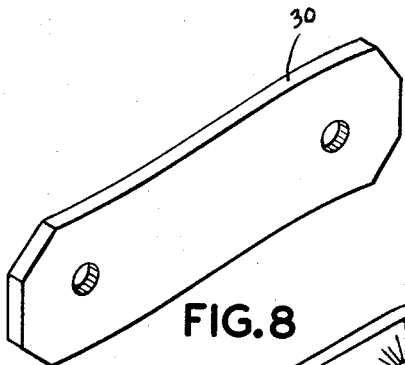
Figure 7:
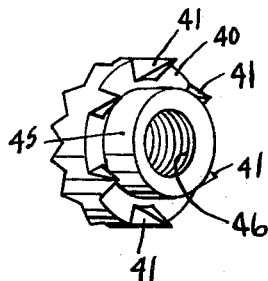
Figure 9:
Figure 10:
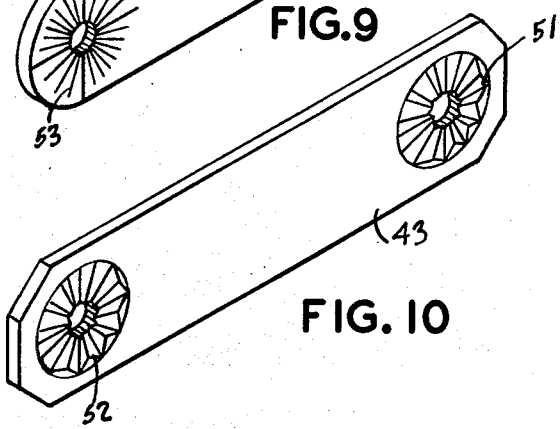
Figure 11:
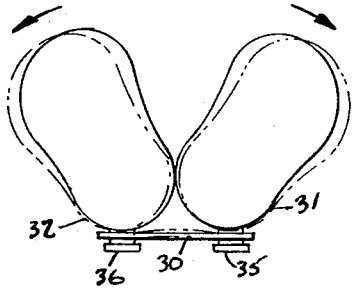
Figure 12:
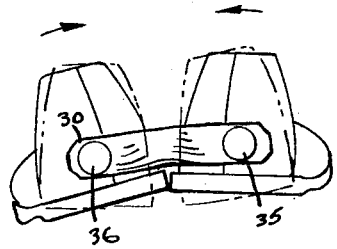
Figure 13:
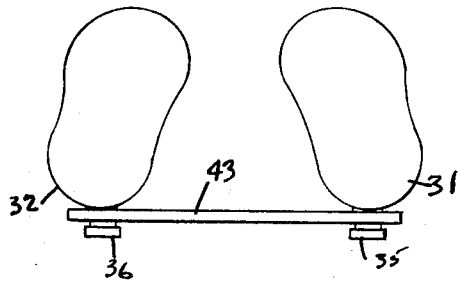
Figure 14:
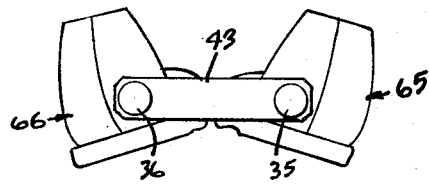
Figure 15:
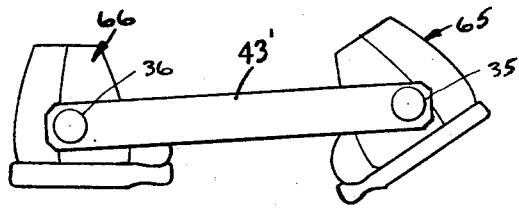
Figure 16:
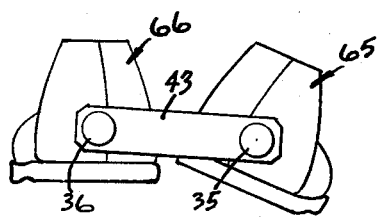
Figure 17:
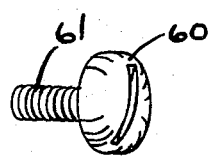
Figure 18:
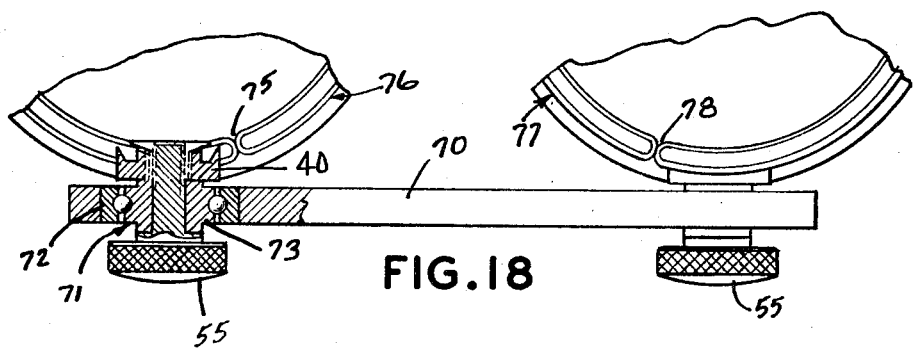
Figure 19:
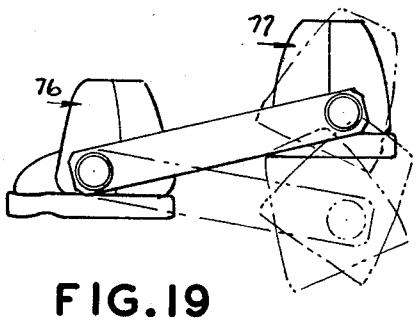
Figure 20:
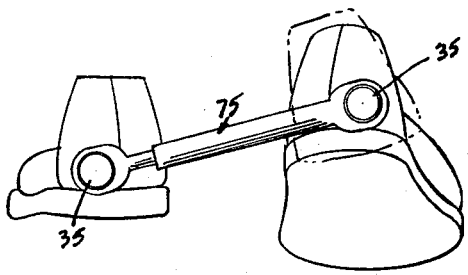
Figure 21:
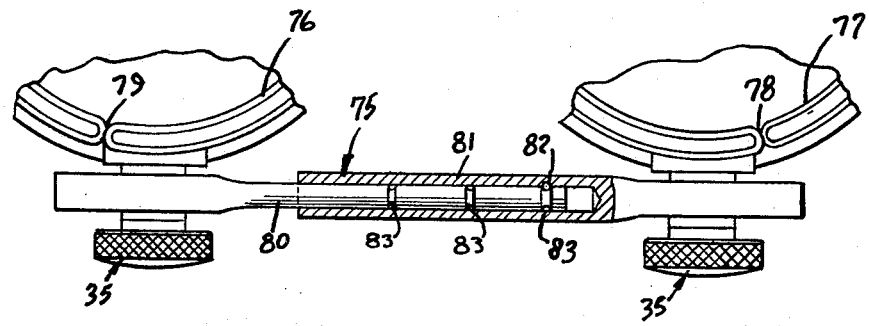
Figure 22:
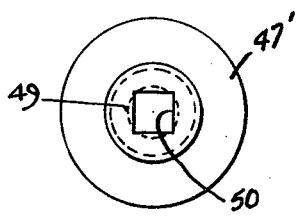
Figure 23:
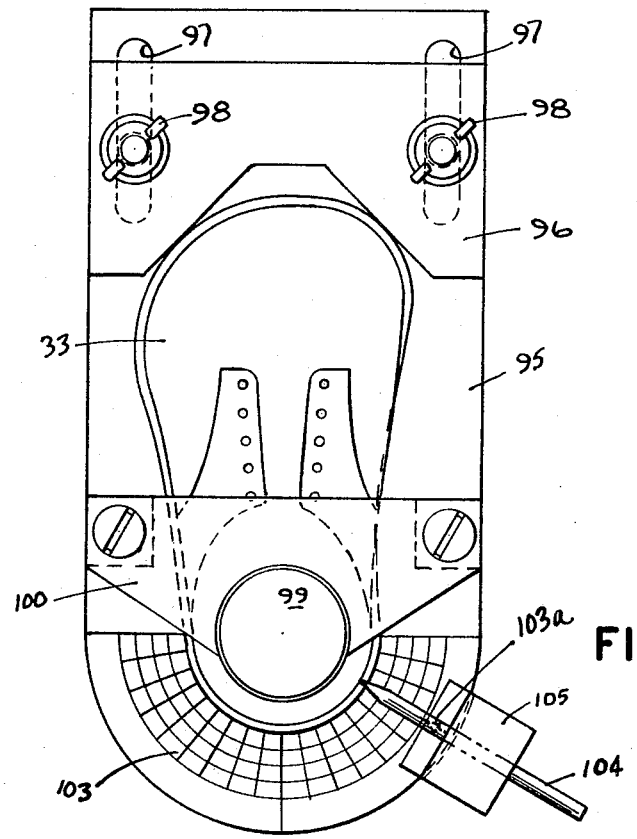
Figure 24:
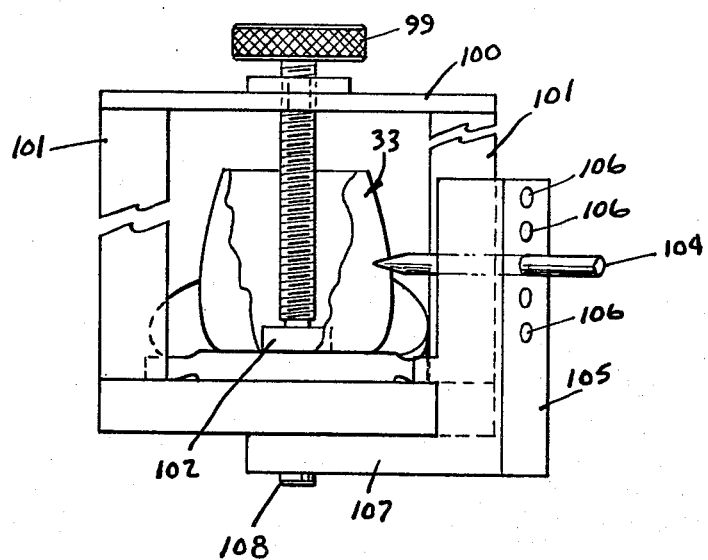

FIG. 1 is a top view of a pair of shoes provided with one form of my improved splint, FIG. 2 is a view as seen at 2—2 of FIG. 1, FIG. 3 shows one of the shoes of FIGS. 1 and 2 detached from the splint and with the protective cap in place, FIG. 4 is an enlarged sectional detail as seen at 4—4 of FIG. 2, FIG. 5 shows the retaining screw for the attaching element, FIG. 6 shows the permanently attached serrated disc which is secured to the shoe counter by means of the screw of FIG. 5, FIG. 7 is a perspective showing the opposite face of the disc of FIG. 6, FIG. 8 is a perspective of one form of flexible splint, FIG. 9 is a perspective showing graduations which may be placed on either the flexible or the rigid splint, FIG. 10 is a perspective showing a rigid splint, FIG. 11 is a schematic view illustrating the flexible or limited movement permissible with the flexible splint shown in FIG. 8, FIG. 12 is a rear view showing permissible movement in the opposite plane also utilizing the flexible splint of FIG. 8, FIG. 13 shows the position of the wearer's shoes when the toes are turned towards each other and using the rigid splint of FIG. 10, FIG. 14 shows the shoe positioned with the toes closer together than the heels and, in addition, rotated to correct a knock-kneed condition, FIG. 15 shows a shoe connected with a rigid splint in which the correction on one foot exceeds that required on the other foot, FIG. 16 is a view showing the general structure of FIG. 15, but with a shorter splint and the shoe positioned for external rotation to correct a pigeontoed condition, FIG. 17 is a perspective showing the protective cap of FIG. 3, FIG. 18 is an enlarged top view partly sectioned showing a rigid splint provided with a swivel joint at the attachment to each shoe permitting limited ankle rotation, FIG. 19 illustrates a series of positions with the splint of FIG. 18 secured on the opposite side of the shoe counter, FIG. 20 is a rear view showing a modified form of splint which permits limited rotation in a different plane, FIG. 21 is an enlarged sectional detail of the splint of FIG. 20, FIG. 22 is a view similar to FIG. 5 but showing a preferred form of the inside sleeve nut for attaching the element to the shoe counters, FIG. 23 is a top view of a fixture for marking the location of the connecting element for the splint in accordance with a given medical prescription, FIG. 24 is an end view partly broken away, of the structure of FIG. 23, FIG. 25 is a perspective of a splint generally similar to that shown in FIGS. 9 and 10 but having at least one slotted aperture and means for retaining the locking element at a predetermined position, FIG. 26 is a perspective showing the reverse side of a modified locking element for cooperating with the grooves shown in FIG. 25, FIG. 27 is a perspective of a flexible strap similar to the one shown in FIG. 8 but having at least one slotted aperture and a series of graduations, FIG. 28 is a perspective showing the bottom of a shoe having a modified form of attaching means for the element which does not involve piercing the counter of the shoe, and FIG. 29 is a rear view of a modified form of splint of the type shown in FIG. 21 but permitting no relative movement whatsoever of the shoe.

Referring now more particularly to the drawings, a flexible splint 30 is secured to the outside quarters of the counters 31 and 32 of each of a pair of shoes 33 and 34. The position of the attaching elements 35 and 36 for each splint is such that the heels 37 and 38 of each shoe abut each other at a contact point such as 39.

In FIG. 1 the position of the corrective shoes is termed one of external rotation since when viewed in plan the toes of the child's feet are turned away from each other to correct a condition sometimes called "pigeon toes." The flexible splint 30 is preferably made of leather or of synthetic plastic material which permits limited movement of the shoes 33 and 34 with respect to each other in directions giving greater external rotation, plantar and dorsal flexion, and also to some extent in a relative up and down direction due to the flexibility of splint 30. However, the shoes at all times are maintained at a minimum angle of external rotation in accordance with the surgeon's prescription. This limited movement is shown in FIGS. 11 and 12. A limited flexion, both plantar and dorsal, is likewise possible within the limits of torsional flexibility of the splint 30.

The connecting element asemblies 35, 36 are shown in greater detail in FIGS. 4–7 and comprise a serrated nut 40 (FIG. 7) having a series of prongs 41, 41 which are drawn into the counters 31 and 32 of each shoe as shown in FIG. 4. The outer face of the nut 40 is provided with radial serrations 42, 42 (FIG. 6) which permit a fixed angular adjustment of either the flexible splint 30 or the rigid splint 43 (FIG. 10). The nut 40 is located at the proper position on the shoe counter 31 by means of a suitable fixture assembly described more fully hereinafter, and the shank 45 of the nut is inserted through a punched or cut hole made in the counter in accordance with the proper setting. The nut 40 is shown with a threaded bore 46 by which the nut is clamped and retained against the counter through the agency of a bolt or headed element 47. Bolt 47 is provided with a slot 48 for reception of a screwdriver so that it may be tightened against the inside of the counter 31. In a preferred form, however, the bore 49 of bolt 47 is provided with a square broached orifice 50 (FIG. 22) suited to receive a square socket wrench thus permitting greater ease in inserting and tightening the bolt 47 due to the fact that the size of the shoe and the location of the nuts 40 on the counters makes it most inconvenient to utilize a screwdriver on the inside for the purpose of tightening the bolt 47 with slot 48.

The nut 40 and bolt 47, or the modified bolt 47' as shown in FIG. 22 are permanently installed in the counter of each shoe and are so constructed that the inside of the counter is free from any protuberance or rough edges that would blister or irritate the child's foot. The serrations 42 on the outer face of the nuts are such that they firmly grip either the flexible splint 30 or complementary serrations 51, 52 in the rigid splint 43. This permits the splint to be attached and maintained at any desired angular position with respect to the shoe counter. Suitable calibrations 53, 53 (FIG. 9) may be provided on either the flexible splint 30 or the rigid splint 43.

When the nuts 40 and bolts 47 have been permanently and properly secured to the shoe counters, the splints whether of the flexible or rigid variety are secured to the shoes by means of a bolt or screw 55 (FIG. 4) which is provided with a washer 56 and a retaining clip 57 for the purpose of preventing the bolt 55 from becoming disengaged with the splint 30 or 43 as the case may be. Clip 57 is carried in an annular groove in the shank of bolt 55 for this purpose. Washer 56 acts as a combined spacer and thrust element particularly suitable for use when the flexible splint is of leather or a similar nonmetallic compressible material. Bolt 55 has a shank 58 which is threaded for reception by the bore 59 of screw 47 or 47'. In this regard the screw 47 functions as a sleeve nut with respect to bolt 55, but simultaneously serves as a bolt for retaining the nut 40.

When the splint is removed from the shoes, normal use is perfectly possible, which condition is frequently recommended by the surgeon during certain times in a given period and usually during the daytime. To avoid the possibility of damage to furniture or fabrics by the serrations 42, they may, if desired, be beveled as shown in FIG. 6 and in addition are provided with a plastic protective cap or cover 60 (FIGS. 3 and 17). This cover 60 has a threaded shank 61 which is screwed into the bore 59 of the bolt 47 in place of the bolt 55.

Referring now to FIGS. 13 and 14, the rigid splint 43 may be secured to the inside of counters 31 and 32 to provide internal rotation as shown in plan in FIG. 13. In this condition the flexible splint is not indicated because the toes are spaced from each other, the internal rotation shown in FIG. 13 may be combined with either clockwise or counterclockwise rotation of each shoe when the backs of the shoes are viewed as in FIG. 14. Both the clockwise rotation of the shoe 65 and the counterclockwise rotation of the shoe 66 as seen in FIG. 14 is called "abduction." Rotation in the opposite direction as shown by the position of shoe 65 in FIG. 15 is called "adduction," and it will be apparent that any combination of these relative positions of the shoes can be achieved with my improved splint assembly. The splint 43' of FIG. 15 is shown as being relatively longer than the splint 43 of FIG. 14. This is readily provided in an inexpensive manner in accordance with the doctor's prescription. FIG. 16 combines positions of abduction and external rotation for the right shoe 65. The left shoe 66 is positioned in external rotation only, whereas the left shoe 66 in FIG. 15 is positioned for internal rotation because the fastening assembly 35 is on the inside counters of shoes 65 and 66 in FIG. 15, and on the outside counters of shoes 65 and 66 in FIG. 16.

In the event that the patient's condition requires a fixed degree of either internal or external rotation combined with the ability to move the feet in either abduction or adduction, I use a rigid splint 70 (FIG. 18) which is secured to the nut 40 by means of a journal or bearing assembly 71. In the form shown in FIG. 18 I have provided an annular ball bearing assembly having an outer race 72 secured in splint 70 and inner race 73 anchored to the nut 40 by means of a knurled thumbscrew 55. Since the back seam 75 of the left shoe 76 in FIG. 18 is to the right of the fastening element, shoe 76 has been provided with several degrees of external rotation. The right shoe 77 as evidenced by the location of the back seam 78, has also been provided with external rotation. The fastening assembly for the right shoe 77 may be of the fixed type shown in FIG. 4, or it may be a counterpart of the rotatable type used on the other end of the splint 70. Where the bearing 71 is used on both ends of the splint 70, exercise in a restricted walking manner is achieved as shown in FIG. 19. In other words, the child is able to move its feet up and down with respect to each other but cannot vary the position of its feet in either internal or external rotation.

The third manner in which correction may be required has to do with bending the feet at the arch in a toes-down or toes-up position, bending the ankle to position the toes down is called "plantar flexion" and bending the toes up at the ankle is termed "dorsal flexion." Where a fixed correction for plantar or dosal flexion is prescribed by the surgeon, the rigid splint 43, 43' or 70 is employed and the amount of flexion is determined by the location of the attaching element on the shoe counters. In some patients, however, a fixed rotation of the feet is indicated with the ability to flex the feet and ankles by moving the toes up or down. The modified splint 75 shown in FIGS. 20 and 21 is employed for this purpose. In this form the splint is rigidly attached to the counter 76 of the shoe by the usual attachment 35. As shown in FIG. 21 the attaching element 35 is positioned on the inside counter, thus giving a condition of internal rotation for both shoes 76 and 77. This is indicated by the location of the back seam 78 and 79. Flexion is provided by a telescopic connection in the splint which is sectionally formed to have a shaft 80 slidable and rotatable in sleeve 81. The slidability in shaft 80 in sleeve 81 is adjustable by positioning the pin 82 in any one of the several grooves in shaft 80. This adjustability of the splint 75 is preset in accordance with the surgeon's prescription. In any adjusted position of extensibility, however, the shaft 80 can turn in the sleeve 81 so that complete flexion as shown in FIG. 20 is permissible. With the splint of FIG. 21 it is also possible to obtain a fixed relative position of the shoes with respect to internal and external rotation, abduction and adduction, as well as plantar and dorsal flexion, provided the pin 82 is inserted through the shaft 80 instead of in the groove 83. With the use of the journaled connection for splint 75 such as shown in FIG. 18 the patient may be permitted to have limited movement in the adduction and abduction directions either by itself or in conjunction with the ability to obtain plantar and dorsal flexion.

It will thus be apparent that I have provided an extremely simple and inexpensive splint for use with corrective shoes and particularly child's corrective shoes, that is readily attached to the shoes, does not prevent the shoes from being put into ordinary usage at times when the splint is not required, and which permits the widest combination of limited movement coupled with rigid control in other directions.

Referring now to FIGS. 23 and 24, in order to provide accurate location for the attaching elements 35 and 36 I provide an improved fixture having a base element 95 to which an adjustable aligning element 96 is secured in slots 97, 97 by means of bolt assemblies 98, 98. The element 96 is suitably notched as shown in FIG. 23 to properly align and position the shoe in the fixture so that the heel of the shoe is generally concentric with a series of graduations at the opposite end of the fixture when held in the fixture by means of knurled screw 99 threaded in member 100 secured to posts 101, 101. The screw 99 is provided with a rotatable element 102 by which the shoe is securely clamped against the base 95 with the heel concentric with a series of graduations or calibrations 103. With the shoe in this position the proper location for attaching the elements 35 and 36 is determined by means of a marker or pencil 104 positioned in the swinging upright post 105 which is provided with a series of holes 106, 106 adapted to receive the marking tool 104. Post 105 is attached to or formed integrally with a rotatable arm 107 pivoted to the bottom of plate 95 by pin 108. A pointer 103a (FIG. 23) indicates the proper graduation to which the marker 104 is turned to enable the surgeon's prescription to be properly filled.

Referring now more particularly to FIGS. 25–27 it will be desirable under some conditions and where merchandising problems make difficult or impossible for the shoe retailer to affix the various attaching elements as described heretofore in the location to give the desired angular adjustment, I provide a modified rigid strap 115 (FIG. 25) which has one fixed hole or aperture 116 and one end of the strap an elongated slot 117 at the other end. This slot permits longitudinal adjustment for the effective length and a modified nut 118 having a plurality of linear grooves or serrations 119 which cooperate with similar serrations 120 on the splint 115. With the use of the rigid splint 115 an adjustable spacing of the shoes as shown in FIGS. 13–16 can be achieved.

The same longitudinal adjustability for the flexible splint is provided as shown in FIG. 27 by means of the slotted splint 125. In this preferred form the splint is provided with a hole 126 at one end and a slot 127 at the opposite end which may have a series of graduations or calibrations 128, 128 to enable the previously described attaching elements 35 or 36 to be secured thereto. In this event, of course, the radial serrations 42, 42 (FIG. 6) will provide ample frictional engagement with the splint 125.

Under the circumstances where it may be considered undesirable to attach elements 35 or 36 directly to the counter I provide a modified form shown in FIG. 28 using an angular bracket 130 rotatably secured to the heel 131 of shoe 132 by means of a locking screw 133. The element 35 or 36 can then be secured in the aperture 134 in any angularly adjusted position instead of in the counter of shoe 132. In other respect the ability to achieve the desired adjustment of the shoes is the same as previously described.

In some patients, particularly those suffering from the condition known as club foot it may be desirable to provide a completely rigid and spaced relationship for the shoes which can be adjusted to any condition of internal or external rotation, plantar and dorsal, flexian, abduction and adduction. A telescopic splint 140, generally constructed in accordance with the splint of FIG. 21 may be secured to the counters or a bracket such as 130 on shoes 141 and 142. As shown in FIG. 29 the attaching element 143 and 144 are secured centrally in the seams 145 and 146. This, however, may be varied as may be desired to achieve the indicated internal or external rotation, as well as adduction and abduction. The space between the shoes and the mount of plantar and dorsal flexion is controlled by means of clamping collar 146 and a set screw 147 which rigidly positions the two telescopic members 140a and 140b of splint. This permits a rigid control of the relative angle of the feet, ankles and legs. In all forms of the invention described above it is apparent that the splint is inextensible and incontractible by the patient during use. In accordance with the surgeon's instructions, the splint may be cut or adjusted to a preset but fixed length.

The fixture described above is operable by the shoe store to accurately locate the attaching points for the splints on either shoe in any rotated angular or vertical position on the shoe counter. It is simple to operate and when used in conjunction with the splint of the present invention enables accurate correction to be made for congenital or acquired deformities of hip, leg, ankle and/or foot. This applies to both bone and muscular conditions.

Having thus described my invention, I claim:

1. In combination, a pair of shoes, each shoe having a heel, a toe portion, and a counter; an inextensible, incontractible, elongated element secured to the counter of each of said shoes substantially above the heel of each to connect the shoes to one another adjacent the counters thereof and to maintain relative movement of said shoes within predetermined angular limits with respect to each other; and detachable means for securing said element to each of said counters at a point on each counter laterally offset from the vertical center line of said counter of each shoe.

2. A splint assembly for corrective shoes and the like comprising a nut, means for attaching said nut to the rear portion of a shoe, a rigid splint element, a screw securing one end of the splint element to the nut, and journal means operatively connected to said one end of said splint element and permitting rotation without axial movement of the splint with respect to the screw and the nut, and means for connecting the other end of said splint to the rear portion of a mating shoe.

3. In combination, a pair of shoes, each shoe comprising a heel and a counter, an inextensible flexible connecting element of preset length secured to the counter of each shoe, the length of said element being only sufficient to permit the heel portions of the shoes to contact each other and thereby provide a limit for internal rotation while simultaneously permitting external rotation from the contact position.

4. An orthopedic apparatus comprising a pair of shoes, each shoe having a heel, a counter, and a toe portion, an inextensible, incontractible, flexible splint of fixed preset length secured to the counter of each of said shoes above the heel of each at a point on each counter laterally offset from the vertical center line of said counter to connect the shoes to one another and to maintain relative movement of said shoes within predetermined angular limits with respect to one another, and means for detachably and adjustably securing said splint to each of said counters.

5. Apparatus in accordance with claim 4 having journal means securing at least one end of the splint to one shoe.

6. Apparatus in accordance with claim 4 having a sectional splint and means for locking the sections of the splint with respect to each other against axial movement while permitting relative rotational movement.

7. Apparatus in accordance with claim 4, said splint being sectional and having means for locking the sections of the splint to each other.

8. Apparatus in accordance with claim 4 which further includes means for fixedly securing the splint to each of the shoes whereby the shoes are maintained in predetermined angular relation with respect to each other.

9. In combination, a pair of shoes, each shoe having a heel, a counter, and a toe portion, an inextensible, incontractible splint secured to the counter of each of said shoes above the heel to connect the shoes to one another adjacent the counters thereof and to maintain relative movement of said shoes within predetermined angular limits with respect to one another; and means including a nut and screw for detachably and adjustably securing said splint to each of said counters.

10. The combination of claim 9, having means for retaining the screw in the splint while permitting rotation therebetween.

11. The combination of claim 9, having a plurality of pointed prongs on the opposite face of the nut, and means for retaining the nut on the counter of the shoe.

12. The combination of claim 9 in which the splint is formed of flexible material.

13. The combination of claim 9 in which the splint is formed of a rigid inflexible material.

14. The combination of claim 9 in which the splint is provided with a series of calibrations for angularly positioning the splint on the nut.

15. The combination of claim 9 in which the nut and the splint are provided with complementary serrations which mesh with one another.

16. The combination of claim 9 in which the splint has at least one elongated slot engaged by the screw for providing lateral adjustment of the distance between each shoe.

References Cited by the Examiner

UNITED STATES PATENTS

| | | | |
|---|---|---|---|
| 1,077,119 | 10/1913 | Bixby | 287—134 X |
| 2,514,870 | 7/1950 | Israel | 128—80 |
| 2,585,342 | 2/1952 | Morgan | 128—80 |
| 2,630,801 | 3/1953 | Mest et al. | 128—80 |
| 2,774,151 | 12/1956 | Dahlquist et al. | 36—67.5 |
| 2,815,021 | 12/1957 | Freeman | 128—80 |
| 2,822,623 | 2/1958 | Legois | 33—189 |
| 2,834,116 | 5/1958 | Hambrick | 33—189 |
| 2,906,261 | 9/1959 | Craig | 128—80 |
| 2,920,620 | 1/1960 | Rogers | 128—80 |
| 2,963,020 | 12/1960 | Moran | 128—80 |

FOREIGN PATENTS 1,126,942  12/1956  France.

OTHER REFERENCES

Orthopedic Appliance Atlas, volume I, 1952, page 491.

RICHARD A. GAUDET, *Primary Examiner.*

JORDAN FRANKLIN, *Examiner.*

R. D. TEGTMEYER, J. W. HINEY, JR.,
*Assistant Examiners.*